US012521738B2

(12) United States Patent
Harris

(10) Patent No.: US 12,521,738 B2
(45) Date of Patent: Jan. 13, 2026

(54) FOAM-AT-A-DISTANCE DISPENSERS HAVING SMALL VOLUME PUMP CHAMBERS AND VALVE ARRANGEMENTS FOR SAME

(71) Applicant: GOJO Industries, Inc., Akron, OH (US)

(72) Inventor: Donald R. Harris, Cuyahoga Falls, OH (US)

(73) Assignee: GOJO Industries, Inc., Akron, OH (US)

( * ) Notice: Subject to any disclaimer, the term of this patent is extended or adjusted under 35 U.S.C. 154(b) by 196 days.

(21) Appl. No.: 18/346,945

(22) Filed: Jul. 5, 2023

(65) Prior Publication Data

US 2024/0017278 A1 Jan. 18, 2024

Related U.S. Application Data

(60) Provisional application No. 63/388,329, filed on Jul. 12, 2022.

(51) Int. Cl.

| | |
|---|---|
| ***B05B 7/00*** | (2006.01) |
| ***B05B 7/26*** | (2006.01) |
| *A47K 5/14* | (2006.01) |

(52) U.S. Cl.

CPC .............. *B05B 7/005* (2013.01); *B05B 7/262* (2013.01); *A47K 5/14* (2013.01)

(58) Field of Classification Search

CPC ........... B05B 7/005; B05B 7/262; A47K 5/14; A47K 5/1208; F04B 13/02; F04B 43/026; F04B 45/043

See application file for complete search history.

(56) References Cited

U.S. PATENT DOCUMENTS

| | | | |
|---|---|---|---|
| 5,540,362 | A | 7/1996 | Azuma et al. |
| 7,611,030 | B2 | 11/2009 | Reynolds et al. |
| 7,621,426 | B2 | 11/2009 | Reynolds et al. |
| 7,635,097 | B2 | 12/2009 | Mazooji et al. |
| 7,837,066 | B2 | 11/2010 | Reynolds et al. |
| 7,909,209 | B2 | 3/2011 | Reynolds et al. |
| 8,893,931 | B2 | 11/2014 | Mizushima |
| 8,960,498 | B2 | 2/2015 | Wegelin et al. |

(Continued)

OTHER PUBLICATIONS

International Search Report and Written Opinion from PCT/US2023/069605 dated Oct. 10, 2023.

*Primary Examiner* — Vishal Pancholi

(74) *Attorney, Agent, or Firm* — Calfee, Halter & Griswold LLP

(57) ABSTRACT

An exemplary foam-at-a-distance dispenser includes a container for holding a fluid, a housing, a dispensing outlet, a motor and a pump. The pump has two or more air pump diaphragms, a liquid pump diaphragm, a liquid inlet, an inner valve plate, two or more air inlet valves secured to the inner valve plate, a liquid inlet valve secured to the inner valve plate, an outer valve support located outside of the inner valve plate, a liquid outlet valve secured to the outer valve support, an air outlet and a liquid outlet. Also included are motor, a wobble plate, a mixing chamber and a foaming cartridge located between the mixing chamber and the dispensing outlet. A liquid dispensing conduit extends from the liquid outlet to the mixing chamber and an air dispensing conduit extending from the air outlet to the mixing chamber.

20 Claims, 7 Drawing Sheets

(56) References Cited

U.S. PATENT DOCUMENTS

| | | | | |
|---|---|---|---|---|
| 9,172,266 | B2 | 10/2015 | Curtis et al. | |
| 9,943,196 | B2 | 4/2018 | Mak et al. | |
| 10,065,199 | B2 | 9/2018 | Twaroski et al. | |
| 10,460,549 | B2 | 10/2019 | Wegelin | |
| 11,122,939 | B2 | 9/2021 | Ciavarella et al. | |
| 2013/0020351 | A1 | 1/2013 | Pelfrey | |
| 2013/0313285 | A1 | 11/2013 | Tizuka et al. | |
| 2014/0124540 | A1 | 5/2014 | Ciavarella et al. | |
| 2015/0157754 | A1 | 6/2015 | Rutter et al. | |
| 2017/0135532 | A1 | 5/2017 | Ciavarella et al. | |
| 2018/0289223 | A1* | 10/2018 | Harris | F04B 23/02 |
| 2020/0037826 | A1* | 2/2020 | Ciavarella | F04B 49/06 |
| 2022/0160184 | A1 | 5/2022 | McNulty et al. | |

* cited by examiner

FOAM-AT-A-DISTANCE DISPENSERS HAVING SMALL VOLUME PUMP CHAMBERS AND VALVE ARRANGEMENTS FOR SAME

RELATED APPLICATIONS

This application claims priority to, and the benefits of, U.S. Provisional Patent Application Ser. No. 63/388,329, which is titled FOAM-AT-A-DISTANCE DISPENSERS HAVING SMALL VOLUME PUMP CHAMBERS AND VALVE ARRANGEMENTS FOR SAME, which was filed on Jul. 12, 2022, and which is incorporated herein by reference in its entirety.

TECHNICAL FIELD

The present invention relates generally to foam-at-a-distance soap and sanitizer dispensers, and more particularly, to valve arrangements for foam-at-a-distance soap and sanitizer dispensers with small liquid pump chambers.

BACKGROUND OF THE INVENTION

Foam pumps having small liquid pump chambers have been used to make foam soap or sanitizer proximate the pump body. Exemplary foam pumps are shown and described in U.S. Pat. Nos. 9,943,196; 10,065,199. When used to pump both liquid and air, the liquid valves may need to be more robust which leads to having large volume areas in the liquid pump chambers. These pumps have small volume pump chambers and increasing the volume of the liquid pump chamber to accommodate a more robust valve, but not the volume of the liquid pump diaphragm itself, may result in problems with the pump, such as, for example, difficulty priming.

SUMMARY

Exemplary embodiments of foam-at-a-distance dispensers are disclosed herein. An exemplary foam-at-a-distance dispenser includes a container for holding a fluid, a housing, a dispensing outlet, a motor and a pump. The pump has two or more air pump diaphragms, a liquid pump diaphragm, a liquid inlet, an inner valve plate, two or more air inlet valves secured to the inner valve plate, a liquid inlet valve secured to the inner valve plate, an outer valve support located outside of the inner valve plate, a liquid outlet valve secured to the outer valve support, an air outlet and a liquid outlet. Also included is a motor, a wobble plate connected to the motor and connected to the two or more air pump diaphragms and the liquid pump diaphragm, a mixing chamber located proximate the dispensing outlet and a foaming cartridge located between the mixing chamber and the dispensing outlet. A liquid dispensing conduit extends from the liquid outlet to the mixing chamber and an air dispensing conduit extending from the air outlet to the mixing chamber.

Another exemplary foam-at-a-distance dispenser includes a container for holding a fluid, a housing, a dispensing outlet, a motor and a pump. The pump has two or more air pump diaphragms, a liquid pump diaphragm, a liquid inlet, an inner valve plate, two or more air inlet valves secured to the inner valve plate, a liquid inlet valve secured to the inner valve plate, and an air outlet valve seat formed in the inner valve plate. An air outlet extends upward from the air outlet valve seat. An outer valve support is located outside of the inner valve plate. A liquid outlet valve is secured to the outer valve support. The liquid outlet valve is located further away from the liquid pump diaphragm than the liquid inlet valve. The pump further includes a liquid outlet. In addition, the dispenser includes a motor, a wobble plate connected to the motor and connected to the two or more air pump diaphragms and the liquid pump diaphragm, a mixing chamber located proximate the dispensing outlet, and a foaming cartridge located between the mixing chamber and the dispensing outlet. A liquid dispensing conduit extends from the liquid outlet to the mixing chamber and an air dispensing conduit extending from the air outlet to the mixing chamber.

An exemplary foam-at-a-distance dispenser includes a container for holding a fluid, a housing, a dispensing outlet, a motor and a pump. The pump has two or more air pump diaphragms, a liquid pump diaphragm, a liquid inlet, an inner valve plate, two or more air inlet valves secured to the inner valve plate, a liquid inlet valve secured to the inner valve plate, an outer valve support located outside of the inner valve plate, a liquid outlet valve secured to the outer valve support, an air outlet and a liquid outlet. A sealing member is located between the inner valve plate and the outer valve support. The sealing member provides a seal around a liquid inlet flow path and a liquid outlet flow path. In addition, the dispenser includes a motor, a wobble plate connected to the motor and connected to the two or more air pump diaphragms and the liquid pump diaphragm, a mixing chamber located proximate the dispensing outlet, and a foaming cartridge located between the mixing chamber and the dispensing outlet. A liquid dispensing conduit extends from the liquid outlet to the mixing chamber and an air dispensing conduit extending from the air outlet to the mixing chamber.

BRIEF DESCRIPTION OF THE DRAWINGS

These and other features and advantages of the present invention will become better understood with regard to the following description and accompanying drawings in which.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning.

"Small pump chambers" should be construed to mean pump chambers that must be operated at least five times for each dispense of fluid.

The term "inner" and "outer" may be used to indicate a location with respect to the pump diaphragms. If two parts have a description of "inner" part and "outer" part, the part identified with inner is closer to the pump diaphragms.

As used herein, the term "foam-at-a-distance" should be construed to mean that the liquid and air are mixed together at as selected distance from the pump. The selected distance is greater than 2 inches. In some instances, the selected distance is greater than 4 inches. In some instances, the selected distance is greater than 6 inches. In some instances, the selected distance is greater than 8 inches. In some instances, the selected distance is greater than 10 inches. In some instances, the selected distance is greater than 12 inches. In some instances, the selected distance is greater than 14 inches. In some instances, the selected distance is greater than 16 inches. In some instances, the selected distance is greater than 18 inches. In some instances, the selected distance is greater than 20 inches. In some instances, the selected distance is greater than 22 inches. In some instances, the selected distance is greater than 24 inches. In addition, "foam-at-a-distance" should be construed to mean that the liquid and air are mixed together at a point close to the outlet of the dispenser and at a location away from the pump.

Figure 1:
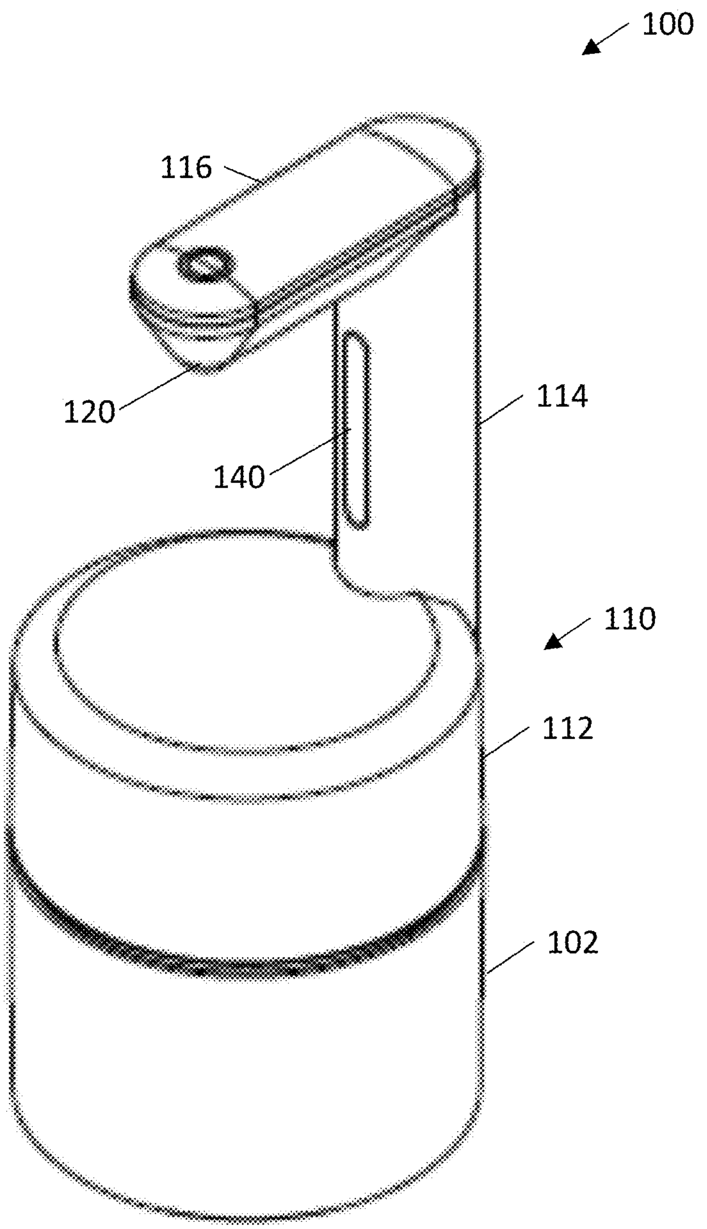
FIG. 1 is a prospective view of an exemplary touch-free foam-at-a-distance dispenser.

FIG. 1 is a touch-free foam-at-a-distance dispenser 100. Dispenser 100 is shown as a table-top dispenser, however, dispenser 100 may be counter mount dispenser, a wall mounted dispenser, or the like. Exemplary touch-fee dispensers are shown and described in U.S. Pat. No. 7,837,066 titled Electronically Keyed Dispensing System And Related Methods Utilizing Near Field Response; U.S. Pat. No. 9,172,266 title Power Systems For Touch Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hands-Free Dispensing of a Measured Quantity of Material; U.S. Pat. No. 7,621,426 titled Electronically Keyed Dispensing Systems and Related Methods Utilizing Near Field Response; and U.S. Pat. No. 8,960,498 titled Touch-Free Dispenser with Single Cell Operation and Battery Banking; U.S. Pat. Pub. No. 2013/0020351 titled Dispenser With Optical Keying System; U.S. Pat. Pub. No. 2014/0124540 titled Under-Counter Mount Foam Dispensing Systems With Permanent Air Compressors And Refill Units For Same; U.S. Pat. Pub. No 2015/0157754 titled Dispensers For, And Methods Of, Disinfecting Hands; U.S. Pat. No. 10,460,549 titled Systems and methods for device usage monitoring and U.S. Pat. No. 11,122,939 titled Fluid dispenser and fluid refill system for fluid dispenser; all which are incorporated herein by reference. Although these dispensers may not be foam-at-a-distance dispensers, the components used and described therein may be modified for use in a foam-at-a-distance dispenser.

Touch-free foam-at-a-distance dispenser 100 includes a container 102 and a dispenser portion 110. Container 102 may be refillable or replaceable. When container 102 is replaceable, container 102 may be referred to as a refill unit. The dispenser portion 110 includes a base housing 112, and upward extending portion 114 and a forward extending portion 116. In addition, dispenser 100 includes an outlet nozzle 120. Located within the upward extending portion 114 is a sensor 140. Sensor 140 may be an infrared sensor, a proximity sensor, an ultrasonic sensor, or the like.

Figure 2:
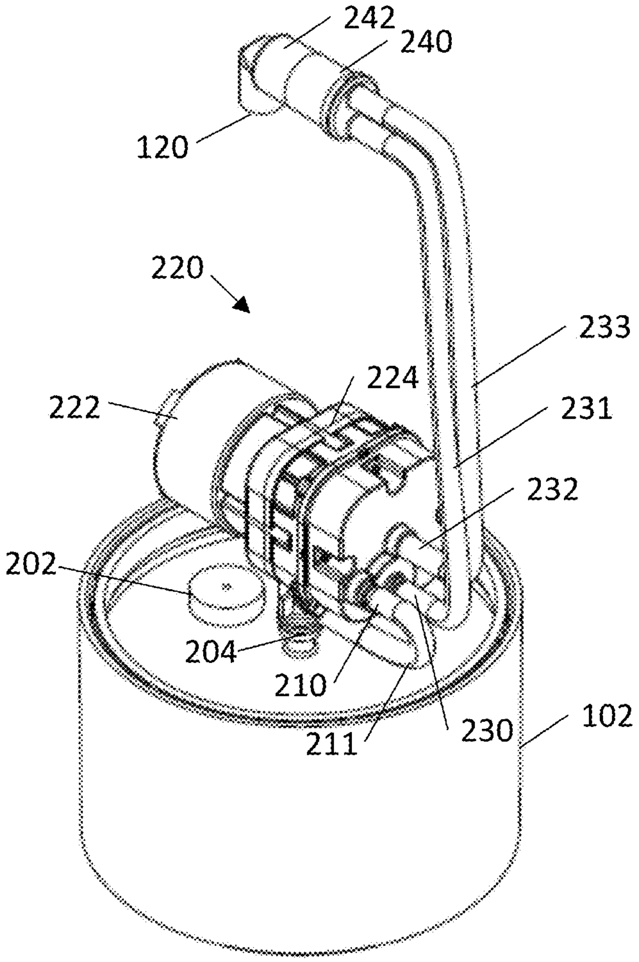
FIG. 2 is a prospective view of a portion of the exemplary touch-free foam-at-a-distance dispenser of FIG. 1.

FIG. 2 is a prospective view of the touch-free foam-at-a-distance dispenser 100 without the housing and other selected components. Touch-free foam-at-a-distance dispenser 100 includes a pump system 220. Pump system 220 includes a motor 222 and a pump 224. Pump 224 is a sequentially activated multi-diaphragm pump. Exemplary embodiments of sequentially activated multi-diaphragm foam pumps may be found in U.S. Pat. No. 10,065,199, which is incorporated herein in its entirety. For a more detailed description on the operation of the sequentially activated multi-diaphragm foam pump, see the disclosure of U.S. Pat. No. 10,065,199. The pumps described in U.S. Pat. No. 10,065,199 mix the liquid and air pumped from their respective pump chambers in the pump, or immediately after the liquid and air leave the pump. Unlike the pumps disclosed in U.S. Pat. No. 10,065,199, the liquid and air pumped from their respective pump chambers of pump 224 are kept separate until the liquid and air are at a selected distance from the pump 224.

Container 102 includes a vent 202. Vent 202 allows air to enter the container 102 when liquid is drawn out of the container 102. If container 102 is refillable, vent 202 allows air to flow out of the container 102 as liquid is added to container 202. Container 102 includes a liquid outlet 204. Liquid outlet 204 has a dip tube (not shown) that extends to the bottom of container 102.

Pump 224 includes a liquid inlet 210, a liquid outlet 230 and an air outlet 232. A liquid inlet conduit 211 extends from the liquid outlet 204 to the liquid inlet or liquid intake 210 of the pump 224. A liquid outlet conduit 231 extends from the liquid outlet 230 of the pump 224 to a mixing chamber 240. An air outlet conduit 233 extends from the air outlet 232 of pump 224 to the mixing chamber 240.

The mixing chamber 240 is located remotely from the pump 224. Remotely should be construed to be at least 2 inches away from the pump. In some instances, remotely may be greater than 4 inches. In some instances, remotely may be greater than 6 inches. In some instances, remotely may be greater than 8 inches. In some instances, remotely may be greater than 12 inches. In some instances, remotely may be greater than 16 inches. In some instances, remotely may be greater than 29 inches. In some instances, remotely may be greater than 24 inches. In addition, the mixing chamber 240 is located proximate the dispensing outlet 120. In foam-at-a-distance systems, liquid and air are pumped separately for the majority of the distance between the pump and the dispensing outlet 120.

Air and liquid are mixed together in mixing chamber 240 and pass through foaming cartridge 242. Foaming cartridge 242 may container two or more screens (not shown) the screens aid in mixing the liquid and air together before it is dispensed out of the dispensing outlet 120. Mixing chamber 240 is preferably located proximate outlet 120. In some instances, mixing chamber 240 is located within 1 inch of outlet 120. In some instances, mixing chamber 240 is located within 2 inch of outlet 120. In some instances, mixing chamber 240 is located within 3 inch of outlet 120. In some instances, mixing chamber 240 is located within 4 inch of outlet 120. In some instances, mixing chamber 240 is located within 5 inch of outlet 120.

Figure 3:
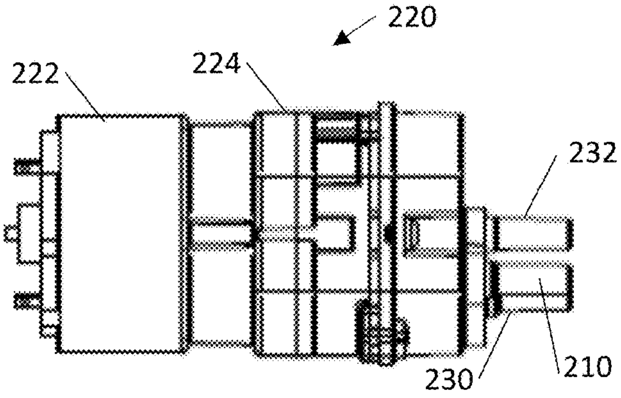
FIG. 3 is a side view of an exemplary motor and pump for a touch-free foam-at-a-distance dispenser.
Figure 4:
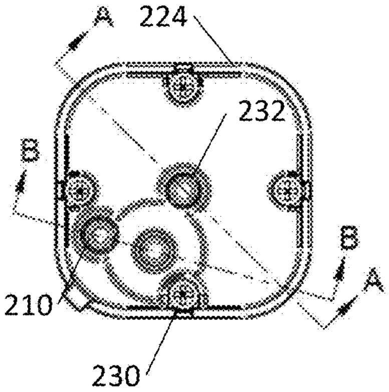
FIG. 4 is a front view of the exemplary pump of FIG. 3.
Figure 5:
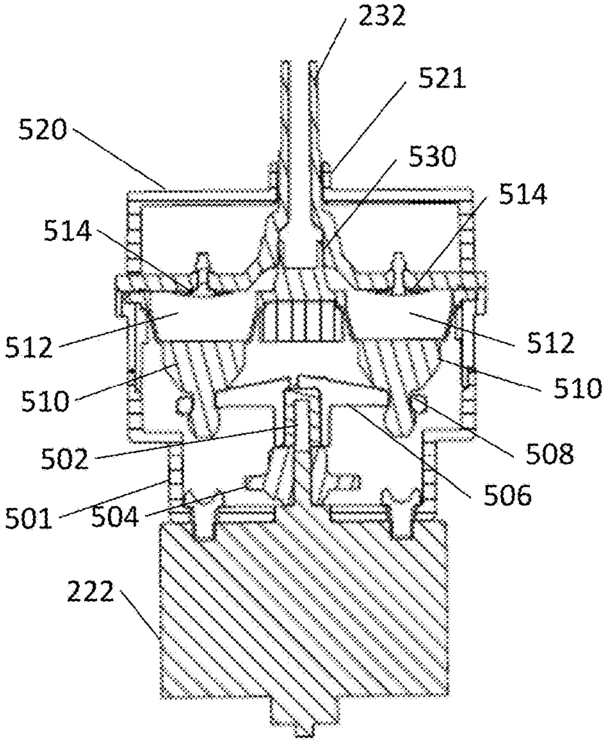
FIGS. 5 and 6 are cross sections of the exemplary motor and pump of FIGS. 3 and 4.
Figure 6:
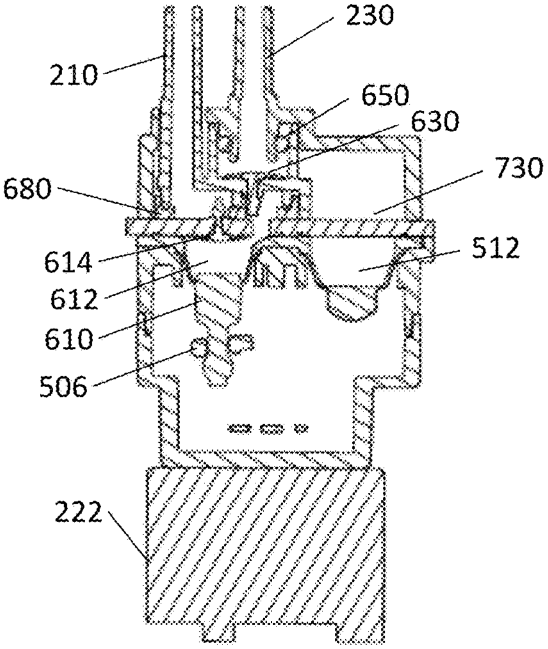
Figure 6A:
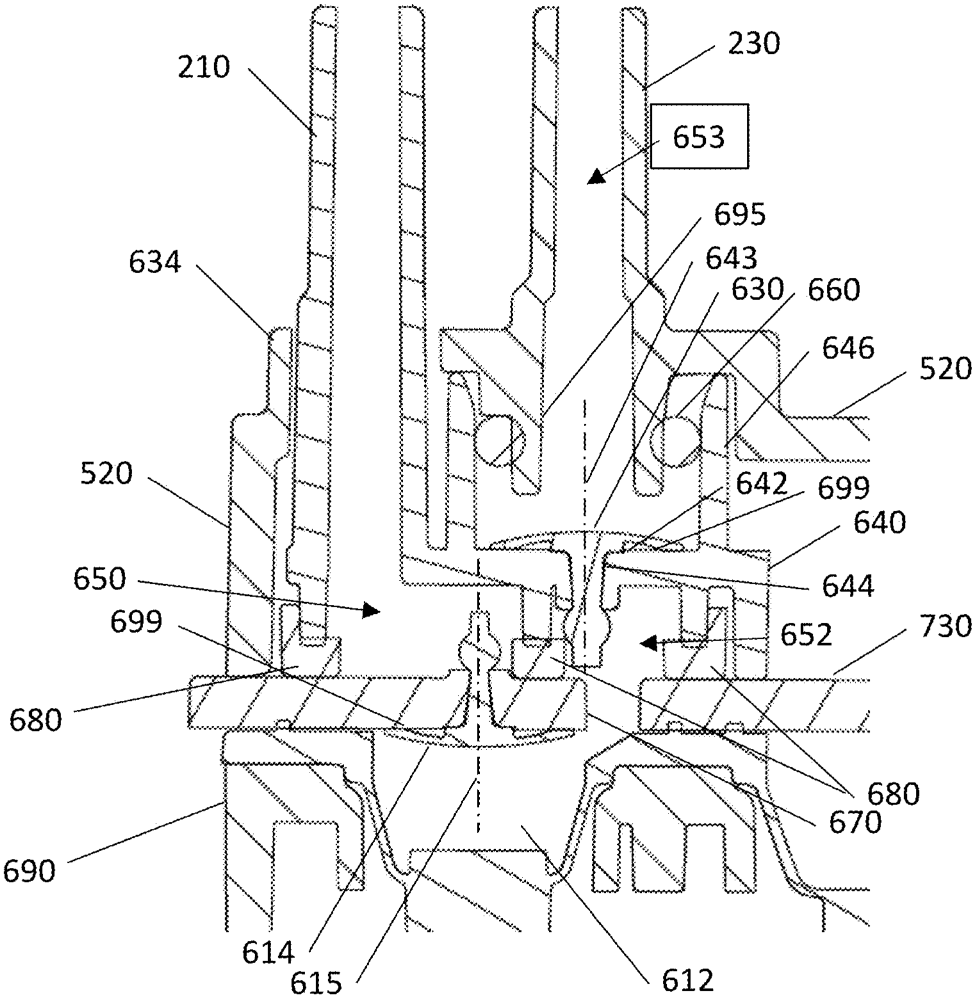
FIG. 6A is an enlarged portion of part of the cross section of FIG. 6.
Figure 7:
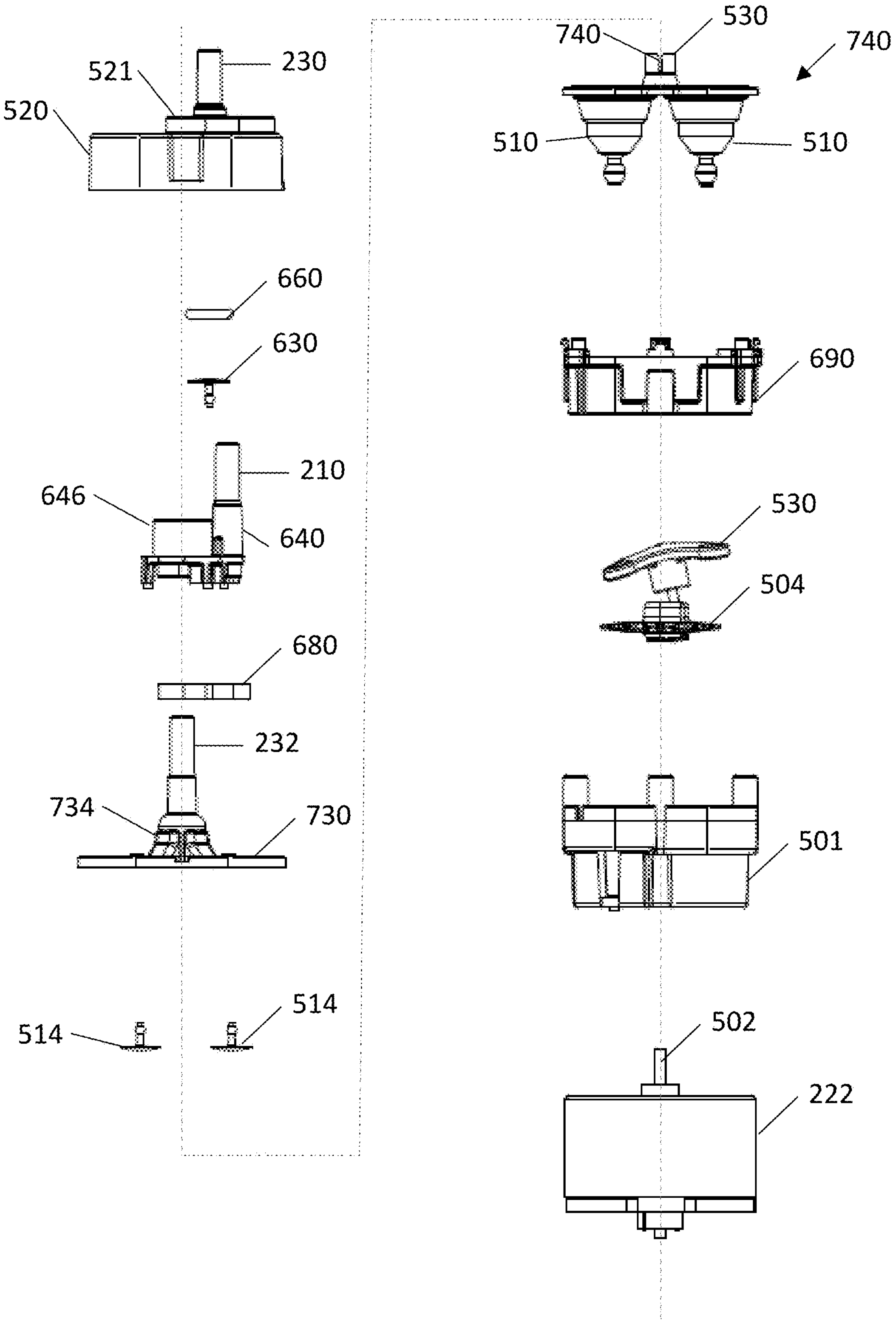
FIGS. 7-9 are exploded views of the exemplary motor and pump of FIGS. 3 and 4.
Figure 8:
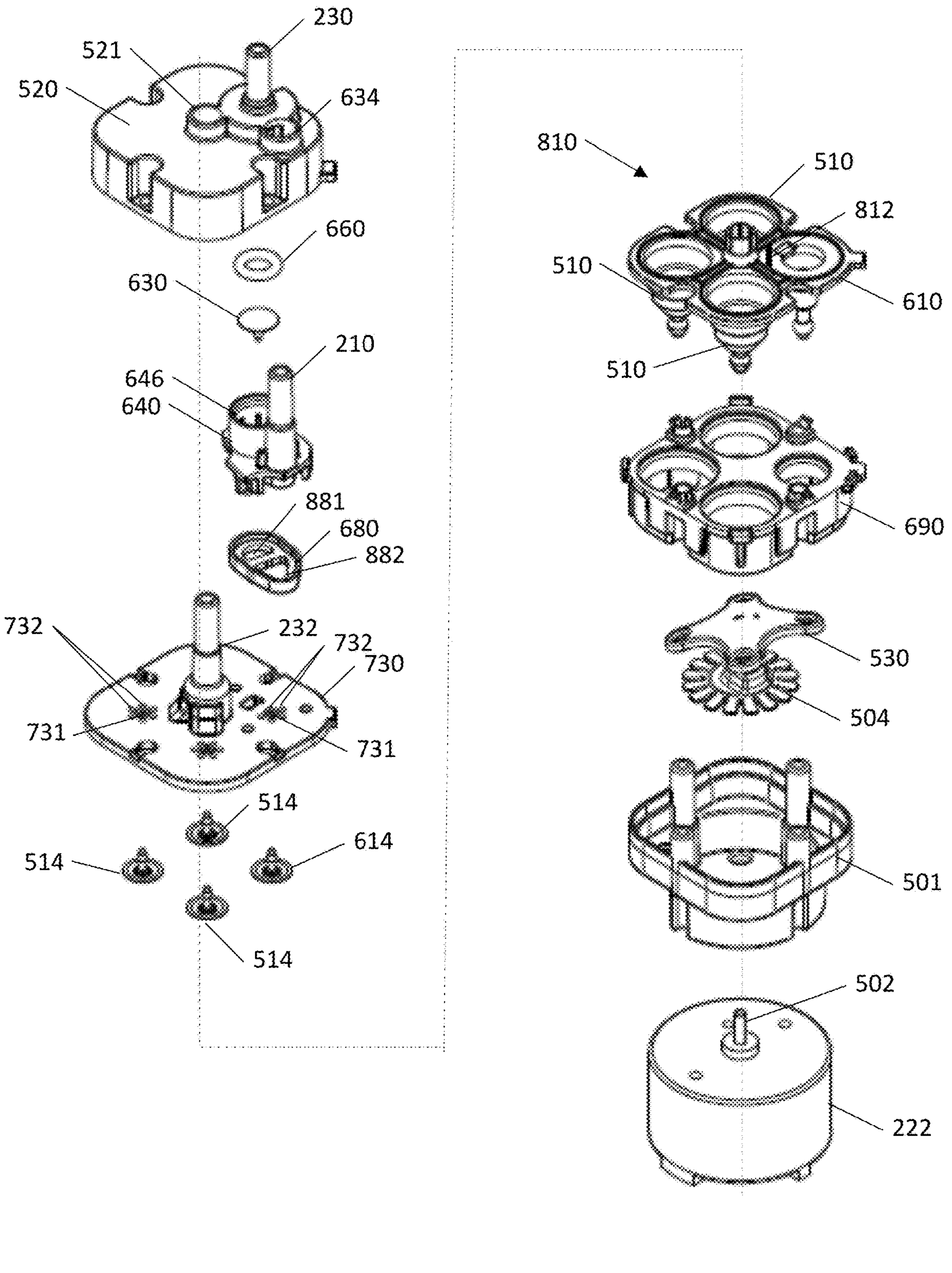
Figure 9:
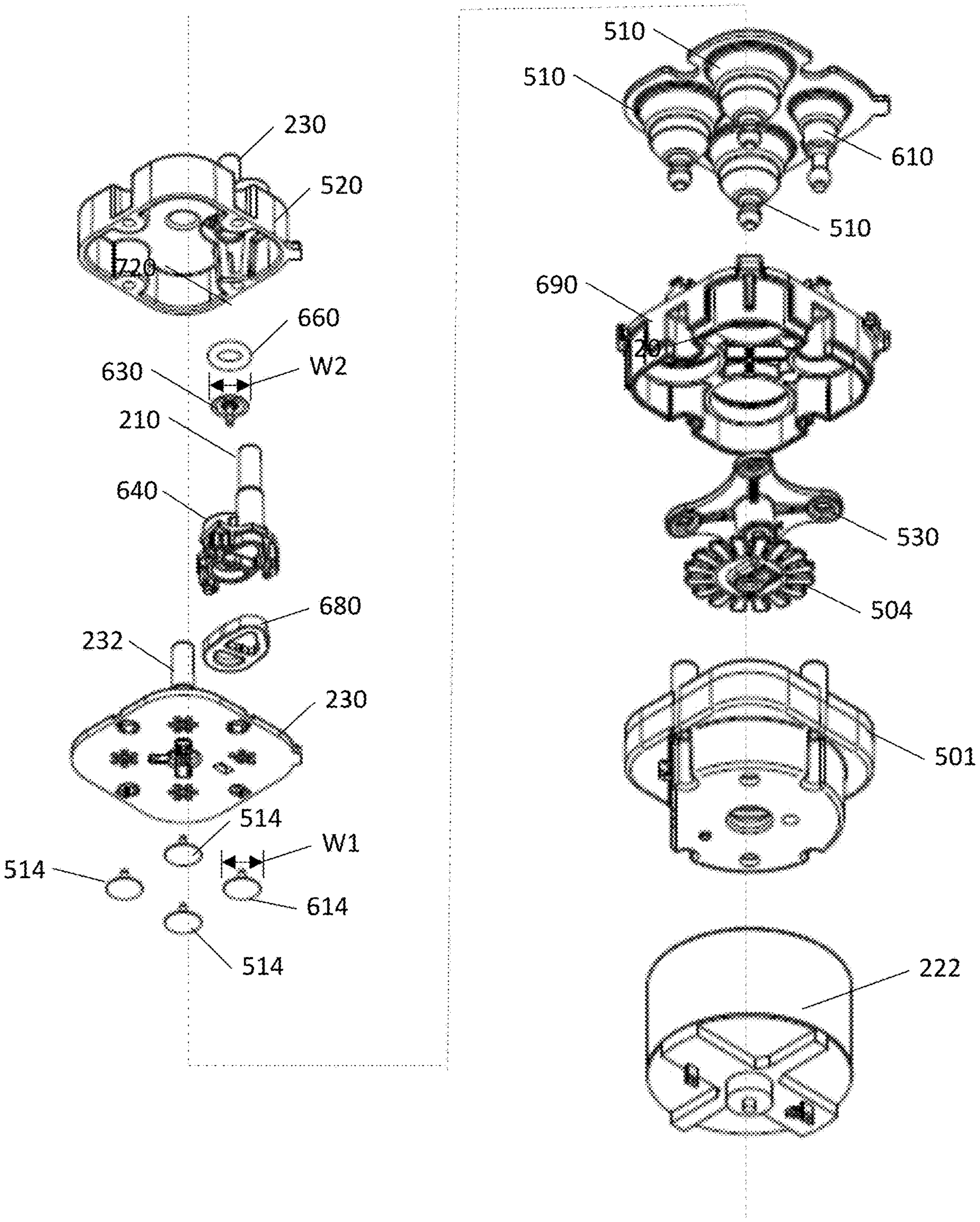

Pump system 220 is described in more detail with respect to FIGS. 3-9. FIG. 3 is a side view of the pump system 220. FIG. 4 is a front elevational view of pump system 220. FIG. 5 is a cross section of pump system 220 through section A-A of FIG. 4. FIG. 6 is a cross section of pump system 220 through section B-B of FIG. 4. FIG. 6A is an enlarged view of a portion of FIG. 6. FIG. 7 is an exploded view of pump system 220 and FIGS. 8 and 9 exploded prospective views of pump system 220.

Pump system 220 includes a motor 222, and pump 224. Motor 222 has a motor shaft 502. Pump 224 is a sequentially activated multi-diaphragm pump. Pump 224 includes a lower housing 502. In this exemplary embodiment, pump system 220 includes an encoder (not shown) and an encoder wheel 504. Encoder wheel 504 is secured to motor shaft 502.

A wobble plate 530 is also connected to motor shaft 502. The connection between motor shaft 502 and wobble plate 530 is an eccentric connection, which causes wobble plate 506 to compress and expand each diaphragm sequentially.

There are three air pump diaphragms 510 and one liquid pump diaphragm 610. Other combinations of liquid to air pump diaphragms are contemplated herein, such as, for example, more than one liquid pump diaphragm, less than three air pump diaphragms, more than three air pump diaphragms, or combinations thereof. Each diaphragm 510, 610 is connected to the wobble plate 506. The air pump diaphragms 510 and liquid pump diaphragm 610 are retained in diaphragm housing 690. In this exemplary embodiment, liquid pump diaphragm 622 has a smaller volume than the air pump diaphragms 510. Each air pump diaphragm 510 at least partially forms an air pump chamber 512.

The three air pump diaphragms 510, one liquid pump diaphragm 512 and the air pump diaphragm outlet valve 530 are a one-piece molded multi diaphragm 810. The one-piece molded multi-diaphragm 810 optionally includes a liquid chamber isolation seal 812. Liquid chamber isolation seal 812 contacts the bottom of inner valve plate 730 and prevents liquid from flowing out of the liquid pump chamber 612 and contacting air outlet valve 530. Seal 812 may be a separate component.

An inner valve plate 730 is located above the air pump diaphragms 510 and liquid pump diaphragm 610. Inner valve plate 730 includes a plurality of valve retaining apertures 731 and fluid flow through apertures 732. In this exemplary embodiment, there are 6 fluid flow through apertures 732 surrounding each valve retaining aperture 731. More or fewer flow through apertures 732 may be used. Air inlet valves 514 are secured to inner valve plate 730 by a valve retaining apertures 731 and are located at the top of each air pump chamber 512. Liquid inlet valve 614 is secured to inner valve plate 730 via a valve retaining aperture 731 and is located at the top of the liquid ump chamber 612.

Located in the center of inner valve plate 730 is an air outlet valve seat 734, upon which air outlet valve 530 seals against when it is not being forced open by air pressure developed by the collapsing of an air pump chamber 512 in this exemplary embodiment, air outlet valve 530 includes a plurality of slits 740, which allows a portion of the air outlet valve 530 to open and close individually for each air pump chamber 512. Extending upward from inner valve plate 730 is air outlet 232. In addition, inner valve plate 730 includes a liquid outlet aperture 670. The liquid outlet aperture 670 allows liquid to flow from the liquid pump chamber 612 to the liquid passage 652.

The volume of liquid passage 652 between the liquid pump chamber outlet aperture 670 should be as small as possible to reduce the possibility of priming issues. In some instances, liquid passage 652 has a volume that is less than the volume of the liquid pump chamber 612. In some instances, liquid passage 652 has a volume that is less than 90% of the volume of the liquid pump chamber 612. In some instances, liquid passage 652 has a volume that is less than 80% of the volume of the liquid pump chamber 612. In some instances, liquid passage 652 has a volume that is less than 70% of the volume of the liquid pump chamber 612. In some instances, liquid passage 652 has a volume that is less than 60% of the volume of the liquid pump chamber 612. In some instances, liquid passage 652 has a volume that is less than 50% of the volume of the liquid pump chamber 612. In some instances, liquid passage 652 has a volume that is less than 40% of the volume of the liquid pump chamber 612. In some instances, liquid passage 652 has a volume that is less than 30% of the volume of the liquid pump chamber 612.

Pump system 220 includes an outer valve support 640. Outer valve support 620 includes a valve plate 642, which includes a valve retaining aperture 644 and a plurality of liquid flow through apertures (not shown). The plurality of liquid flow through apertures are sealed off, when liquid outlet valve 630 is closed and allow for the passage of liquid when liquid outlet valve 630 is opened. Outlet valve support 640 includes an upward extending annular projection 646, which surrounds liquid outlet valve 630. Outlet valve support 640 includes a liquid inlet 210. A liquid inlet passage 650 is formed in outlet valve support 640. A liquid outlet passage 652 is also formed in a portion of outlet valve support 640.

An optional sealing member 680 is included. Sealing member 680 forms a liquid tight seal between outlet valve support 640 and inner valve plate 730. Sealing member 640 has a first aperture 880 that allows liquid to flow from the liquid inlet passage 650 into the liquid pump diaphragm 612 and a second aperture that allows liquid to flown into the liquid outlet passage 652.

In this exemplary embodiment, liquid outlet valve 630 is located above and off set of liquid inlet valve 614. In some embodiments, this configuration is used to minimize the volume of liquid passage 652. Liquid outlet valve 630 has a central axis 643 and liquid inlet valve 614 has a central axis 615. Central axis 615 of liquid inlet valve 614 is parallel to central axis 643 of liquid outlet valve 630. In this exemplary embodiment, the distance between central axis 615 and central axis 643 is less than the width W1 of liquid inlet valve 614 and less than the width W2 of liquid outlet valve 630. In some exemplary embodiments, the distance between the central axis 615 and the central axis 642 is less than 13 mm. In some exemplary embodiments, the distance between the central axis 615 and the central axis 642 is less than 12 mm. In some exemplary embodiments, the distance between the central axis 615 and the central axis 642 is less than 10 mm. In some exemplary embodiments, the distance between the central axis 615 and the central axis 642 is less than 9 mm. In some exemplary embodiments, the distance between the central axis 615 and the central axis 642 is less than 8 mm. In some exemplary embodiments, the distance between the central axis 615 and the central axis 642 is less than 7 mm. In some exemplary embodiments, the distance between the central axis 615 and the central axis 642 is less than 6 mm. In some exemplary embodiments, the distance between the central axis 615 and the central axis 642 is less than 5 mm. In some exemplary embodiments, the distance between the central axis 615 and the central axis 642 is less than 4 mm. It has been found that in some embodiments, decreasing the distance between central axis 615 and central axis 643 increases the performance of the pump 224. In some embodiments, if the distance is too great, the pump 224 will not reliably prime.

Liquid inlet valve 614 seals against a sealing surface 698 of the inner valve plate 730. Liquid outlet valve 630 seals against a sealing surface 699 of outer valve support 640. In some exemplary embodiments, the distance between the sealing surface 698 and sealing surface 699 is less than 13 mm. In some exemplary embodiments, the distance between the sealing surface 698 and sealing surface 699 is less than 12 mm. In some exemplary embodiments, the distance between the sealing surface 698 and sealing surface 699 is less than 11 mm. In some exemplary embodiments, the distance between the sealing surface 698 and sealing surface 699 is less than 10 mm. In some exemplary embodiments, the distance between the sealing surface 698 and sealing surface 699 is less than 9 mm. In some exemplary embodiments, the distance between the sealing surface 698 and sealing surface 699 is less than 8 mm. In some exemplary embodiments, the distance between the sealing surface 698 and sealing surface 699 is less than 7 mm. In some exemplary embodiments, the distance between the sealing surface 698 and sealing surface 699 is less than 6 mm. In some exemplary embodiments, the distance between the sealing surface 698 and sealing surface 699 is less than 5 mm. In some exemplary embodiments, the distance between the sealing surface 698 and sealing surface 699 is less than 4 mm. It has been found that in some embodiments, decreasing the distance between sealing surface 698 and sealing surface 699 increases the performance of the pump 224. In some embodiments, if the distance is too great, the pump 224 will not reliably prime.

Pump system 220 includes an upper housing 520. Upper housing 520 includes liquid outlet 230, an opening surrounded by annular projection 521 for receiving air outlet 323. In addition, upper housing 520 includes an opening surrounded by annular projection 634 for receiving liquid inlet 210. Liquid outlet 230 has a lower annular projection 695. A sealing member 660, which may be, for example, an o-ring goes around the outside of lower annular projection 695 and forms a seal against annular projection 646 of valve support 640 to form a liquid tight seal. A liquid passage 653 is formed in upper housing member 520 and in cylindrical projection 646.

While various inventive aspects, concepts and features of the inventions may be described and illustrated herein as embodied in combination in the exemplary embodiments, these various aspects, concepts, and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

I claim:

1. A foam dispenser comprising:
- a container for holding a fluid;
- a housing;
- a dispensing outlet;
- a motor;
- a pump;
  - the pump having
    - two or more air pump diaphragms;
    - a liquid pump diaphragm;
    - a liquid pump chamber formed in the liquid pump diaphragm;
    - a liquid inlet;
    - an inner valve plate;
    - two or more air inlet valves secured to the inner valve plate;
    - a liquid inlet valve secured to the inner valve plate;
    - an outer valve support located outside of the inner valve plate;
    - a liquid outlet valve secured to the outer valve support;
    - an air outlet;
    - a liquid outlet;
    - wherein the air outlet and the liquid outlet are separate from one another;
- a wobble plate connected to the motor and connected to the two or more air pump diaphragms and the liquid pump diaphragm;
- a mixing chamber located proximate the dispensing outlet;
- a liquid conduit extending from the liquid outlet to the mixing chamber;
- an air conduit extending from the air outlet to the mixing chamber; and
- a foaming cartridge located between the mixing chamber and the dispensing outlet;
- a liquid dispensing conduit extending from the liquid outlet to the mixing chamber.

2. The foam dispenser of claim 1 wherein the liquid inlet valve has a liquid inlet valve axis and the liquid outlet valve has a liquid outlet valve axis and wherein the liquid inlet valve central axis is parallel to the liquid outlet valve central axis.

3. The foam dispenser of claim 1 wherein the liquid outlet valve is further away from the liquid pump diaphragm than the liquid inlet valve.

4. The foam dispenser of claim 1 wherein the liquid outlet valve is further away from the liquid pump diaphragm than the liquid inlet valve and the liquid outlet valve is offset from the liquid inlet valve.

5. The foam dispenser of claim 1 wherein the outer valve support further comprises an annular projection that surrounds the liquid outlet valve.

6. The foam dispenser of claim 1 further comprising an end cap, wherein the end cap connects to the outer valve support and at least partially forms a liquid outlet path.

7. The foam dispenser of claim 1 further comprising a seal located at least partially between the inner valve plate and the outer valve support.

8. The foam dispenser of claim 7 wherein the seal forms a seal around the liquid inlet fluid flow path and a seal around the liquid outlet fluid flow path.

9. The foam dispenser of claim 1 wherein the liquid inlet valve lies along a first axis and the liquid outlet valve lies along a second axis and wherein the distance between the first axis and the second axis is less than 13 millimeters.

10. The foam dispenser of claim 1 further comprising a liquid passage between the liquid pump chamber and the liquid outlet valve and wherein the volume of the liquid passage is less than or equal to the volume of the pump chamber.

11. The foam dispenser of claim 1 wherein the volume of the liquid passage is less than or equal to 50% of the volume of the pump chamber.

12. The foam dispenser of claim 1 wherein the inner valve support and the outer valve support are located within 13 millimeters of one another.

13. A foam dispenser comprising:
a container for holding a fluid;
a housing;
a dispensing outlet;
a motor;
a pump;
the pump having
two or more air pump diaphragms;
a liquid pump diaphragm;
a liquid inlet;
an inner valve plate;
two or more air inlet valves secured to the inner valve plate;
a liquid inlet valve secured to the inner valve plate;
an air outlet valve seat formed in the inner valve plate;
an air outlet extending upward from the air outlet valve seat;
an outer valve support located outside of the inner valve plate;
a liquid outlet valve secured to the outer valve support;
a liquid outlet;
wherein the liquid outlet valve is located further away from the liquid pump diaphragm than the liquid inlet valve;
a wobble plate connected to the motor and connected to the two or more air pump diaphragms and the liquid pump diaphragm;
a mixing chamber located proximate the dispensing outlet;
a foaming cartridge located between the mixing chamber and the dispensing outlet;
a liquid dispensing conduit extending from the liquid outlet to the mixing chamber; and
an air dispensing conduit extending from the air outlet to the mixing chamber.

14. The foam dispenser of claim 13 wherein the liquid outlet valve is offset from the liquid inlet valve.

15. The foam dispenser of claim 13 wherein the outer valve support further comprises an annular projection that surrounds the liquid outlet valve.

16. A foam dispenser comprising:
a container for holding a fluid;
a housing;
a dispensing outlet;
a motor;
a pump;
the pump having
two or more air pump diaphragms;
a liquid pump diaphragm;
a liquid inlet;
an inner valve plate;
two or more air inlet valves secured to the inner valve plate;
a liquid inlet valve secured to the inner valve plate;
an outer valve support located outside of the inner valve plate;
a liquid outlet valve secured to the outer valve support;
an air outlet;
a liquid outlet;
a sealing member located between the inner valve plate and the outer valve support;
wherein the sealing member provides a seal around a liquid inlet flow path and a liquid outlet flow path;
a wobble plate connected to the motor and connected to the two or more air pump diaphragms and the liquid pump diaphragm;
a mixing chamber located proximate the dispensing outlet;
a foaming cartridge located between the mixing chamber and the dispensing outlet;
a liquid dispensing conduit extending from the liquid outlet to the mixing chamber; and
an air dispensing conduit extending from the air outlet to the mixing chamber.

17. The foam dispenser of claim 16 wherein the liquid inlet valve has a liquid inlet valve axis and the liquid outlet valve has a liquid outlet valve axis and wherein the liquid inlet valve central axis is parallel to the liquid outlet valve central axis.

18. The foam dispenser of claim 16 wherein the liquid outlet valve is further away from the liquid pump diaphragm than the liquid inlet valve.

19. The foam dispenser of claim 16 wherein the liquid outlet valve is further away from the liquid pump diaphragm than the liquid inlet valve and the liquid outlet valve is offset from the liquid inlet valve.

20. The foam dispenser of claim 16 wherein the two or more air pump diaphragms and the liquid pump diaphragms are a single molded part.

* * * * *